United States Patent
Machani et al.

(10) Patent No.: US 9,455,968 B1
(45) Date of Patent: Sep. 27, 2016

(54) PROTECTION OF A SECRET ON A MOBILE DEVICE USING A SECRET-SPLITTING TECHNIQUE WITH A FIXED USER SHARE

(71) Applicant: EMC Corporation, Hopkinton, MA (US)

(72) Inventors: Salah Machani, Toronto (CA); Nikolaos Triandopoulos, Arlington, MA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/577,206

(22) Filed: Dec. 19, 2014

(51) Int. Cl.
*H04L 9/00* (2006.01)
*H04L 1/00* (2006.01)
*H04L 29/06* (2006.01)

(52) U.S. Cl.
CPC .......... *H04L 63/062* (2013.01); *H04L 63/0428* (2013.01)

(58) Field of Classification Search
CPC ........ G06F 17/00; G06F 21/62; G06F 15/16; G06F 9/00; G06F 7/04; G06F 17/30; H04L 9/32; H04L 9/08; H04L 63/062; H04L 9/083; H04L 9/085
USPC .............. 726/12, 27, 30; 713/168, 170–171; 380/47, 281
See application file for complete search history.

(56) References Cited

U.S. PATENT DOCUMENTS

| | | | |
|---|---|---|---|
| 7,634,659 B2 * | 12/2009 | Fahrny | G06Q 20/3674 380/47 |
| 8,302,204 B2 * | 10/2012 | Grummt | H04L 29/12594 726/12 |
| 2002/0071566 A1 * | 6/2002 | Kurn | H04L 63/062 380/281 |
| 2012/0323777 A1 * | 12/2012 | Liberty | G06Q 20/223 705/41 |
| 2013/0185815 A1 * | 7/2013 | Leotsarakos | G06F 21/36 726/30 |

OTHER PUBLICATIONS

Keita Emura, et al.; "Ideal Secret Sharing Schemes With Share Selectability," Proceedings of the 13th International Conference of Information and Communications Security (ICICS 2011), Beijing, China; Nov. 23-26, 2011; pp. 143-157.
Salah Machani, et al.; "System and Method for Key Material Protection on Devices Using a Secret Sharing Scheme"; U.S. Appl. No. 14/319,276, filed Jun. 30, 2014.
Salah Machani, et al.; "Protecting Master Encryption Keys in a Distributed Computing Environment"; U.S. Appl. No. 14/575,295, filed Dec. 18, 2014.

* cited by examiner

Primary Examiner — Thanhnga B Truong
(74) Attorney, Agent, or Firm — BainwoodHuang

(57) ABSTRACT

A method includes (1) receiving, by a mobile computing device (MCD), user-specific data from a user, (2) processing (a) a user share of a cryptographic key, the user share being fixed based on the received user-specified data, and (b) a local share of the cryptographic key to recreate the cryptographic key, wherein the local share was created by applying a secret splitting algorithm to the cryptographic key and the user share to yield a set of non-fixed shares including the local share, the user share and the set of non-fixed shares making up a set of shares of the cryptographic key, the cryptographic key being recreatable from a strict subset of the set of shares, and (3) decrypting encrypted data stored on the MCD using the recreated cryptographic key, thereby providing access, using the decrypted encrypted data, to the resource.

21 Claims, 8 Drawing Sheets

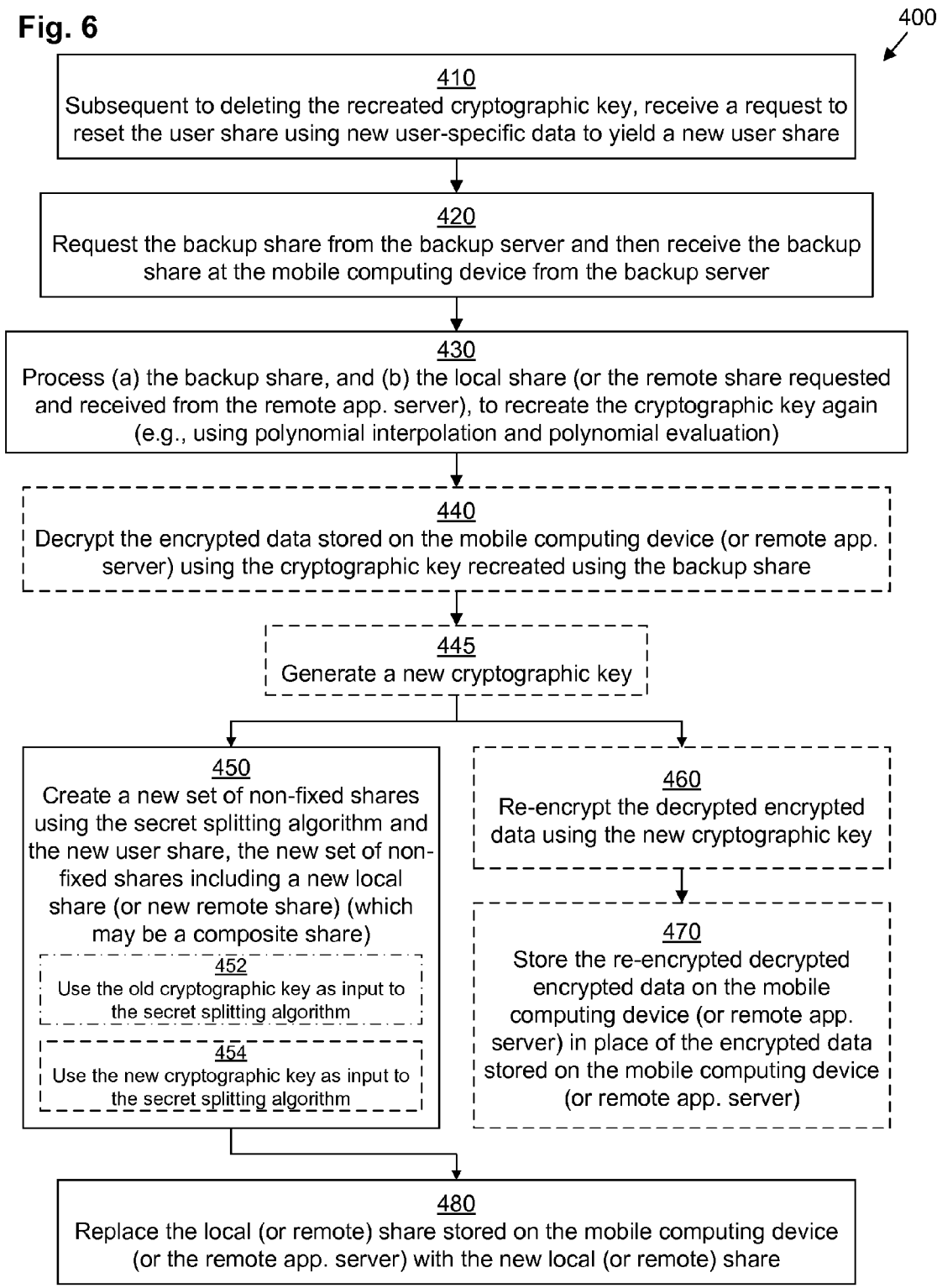

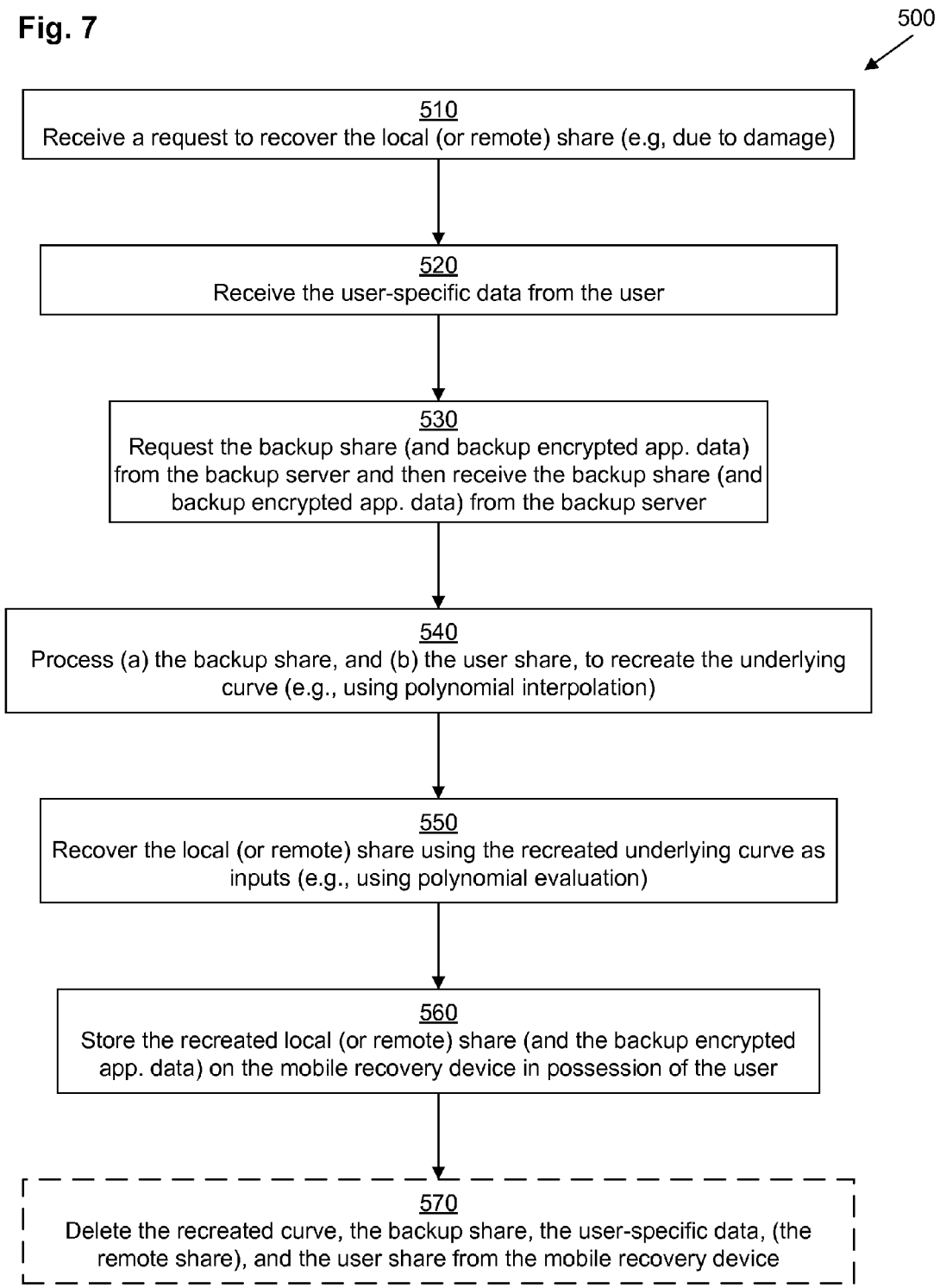

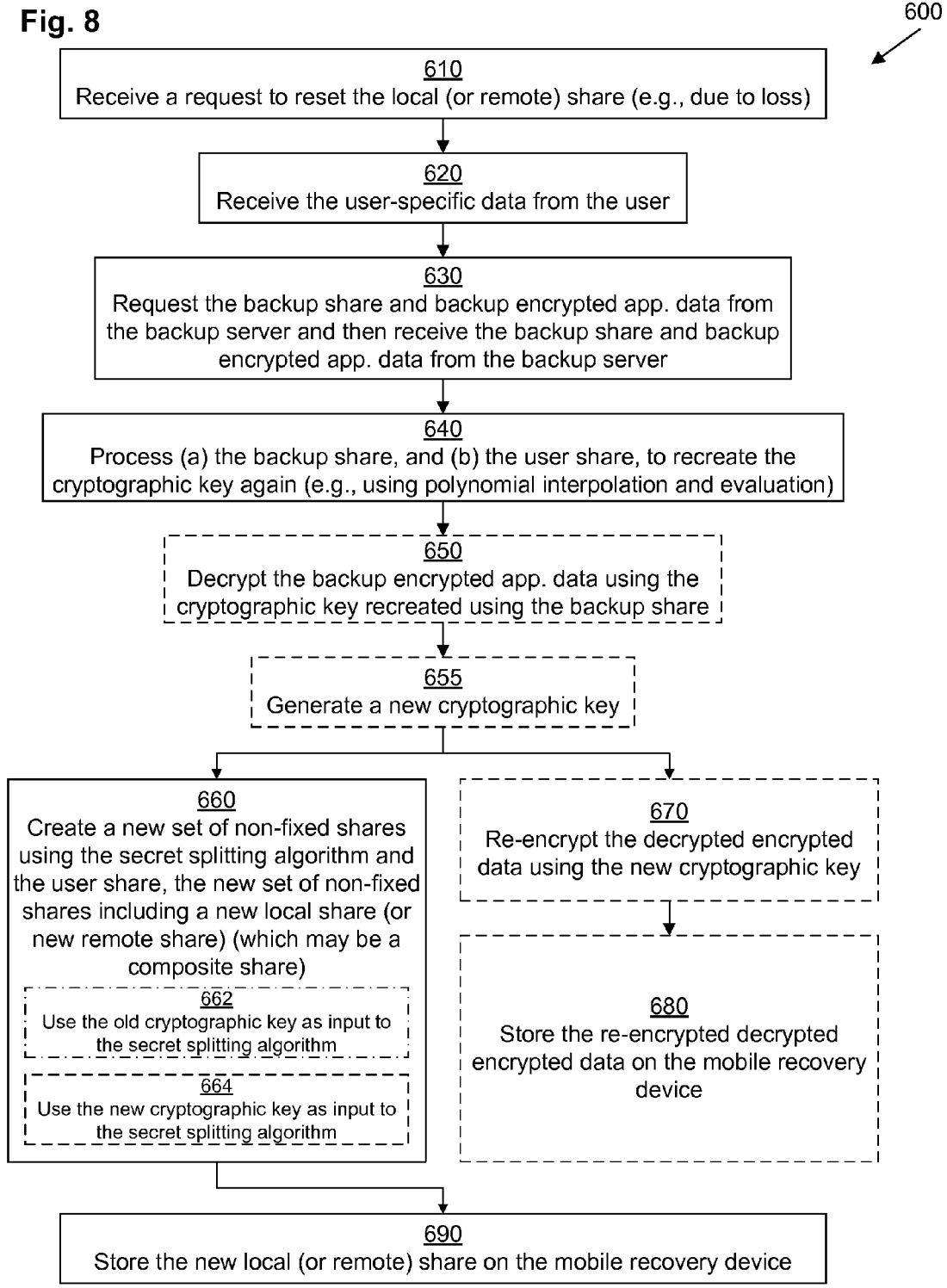

PROTECTION OF A SECRET ON A MOBILE DEVICE USING A SECRET-SPLITTING TECHNIQUE WITH A FIXED USER SHARE

BACKGROUND

Mobile devices may store secret passwords, keys, or other secret data. In order to prevent an unauthorized user of a mobile device from accessing these secrets, various techniques have been used.

In some examples, a master user password is used. In one conventional system, a user enters the master password, and secret keys are derived from the master password using predetermined algorithms. In another conventional system, the secret keys are randomly generated and then encrypted using the master user password or an intermediary key derived from the master password.

SUMMARY

Unfortunately, the above-described conventional systems suffer from deficiencies. For example, these systems are only as strong as the master user password used. However, due to usability concerns, user passwords are generally not very strong, so an attacker who is able to guess the user's master password is able to easily obtain secret data. Thus, it would be desirable to strongly protect secret data (e.g., for restricting access to a resource) stored on a mobile device even if the user's password is not robust.

This may be accomplished by randomly generating a strong encryption key used to protect the secret data and then utilizing a secret splitting technique to create a plurality of shares of the strong encryption key, one of which is fixed based on the user's password or other user-specific data. Only by appropriately combining more than one of these shares is the strong encryption key unlocked. Further, no information about the strong encryption key can be leaked unless the strong encryption key is unlocked by the appropriate shares being used.

One embodiment of the improved techniques is directed to a method of accessing a resource. The method includes (1) receiving, by a mobile computing device via user interface circuitry, user-specific data from a user, (2) processing, by the mobile computing device, (a) a user share of a cryptographic key, the user share being fixed based on the received user-specified data, and (b) a local share of the cryptographic key, the local share being currently unknown outside of the mobile computing device, to recreate the cryptographic key, wherein the local share was created by applying a secret splitting algorithm to the cryptographic key and the user share to yield a set of non-fixed shares including the local share, the user share and the set of non-fixed shares making up a set of shares of the cryptographic key, the cryptographic key being recreatable from a strict subset of the set of shares, and (3) decrypting, by the mobile computing device, encrypted data stored on the mobile computing device using the recreated cryptographic key, thereby providing access, using the decrypted encrypted data, to the resource. Other embodiments are directed to a system, a computerized apparatus, and a computer program product for performing methods of accessing a resource similar to those described above.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 6 is a flowchart depicting an example method of resetting a user share according to various embodiments.

FIG. 7 is a flowchart depicting an example method of recovering a non-fixed share according to various embodiments.

FIG. 8 is a flowchart depicting an example method of resetting a non-fixed share according to various embodiments.

DETAILED DESCRIPTION

Embodiments are directed to techniques for randomly generating a strong encryption key used to protect secret data and then utilizing a secret splitting technique to create a plurality of shares of the strong encryption key, one of which is fixed based on the user's password or other user-specific data. Only by appropriately combining more than one of these shares is the strong encryption key unlocked. No information about the strong encryption key can be leaked unless the strong encryption key is unlocked by the appropriate shares being used.

Figure 1:
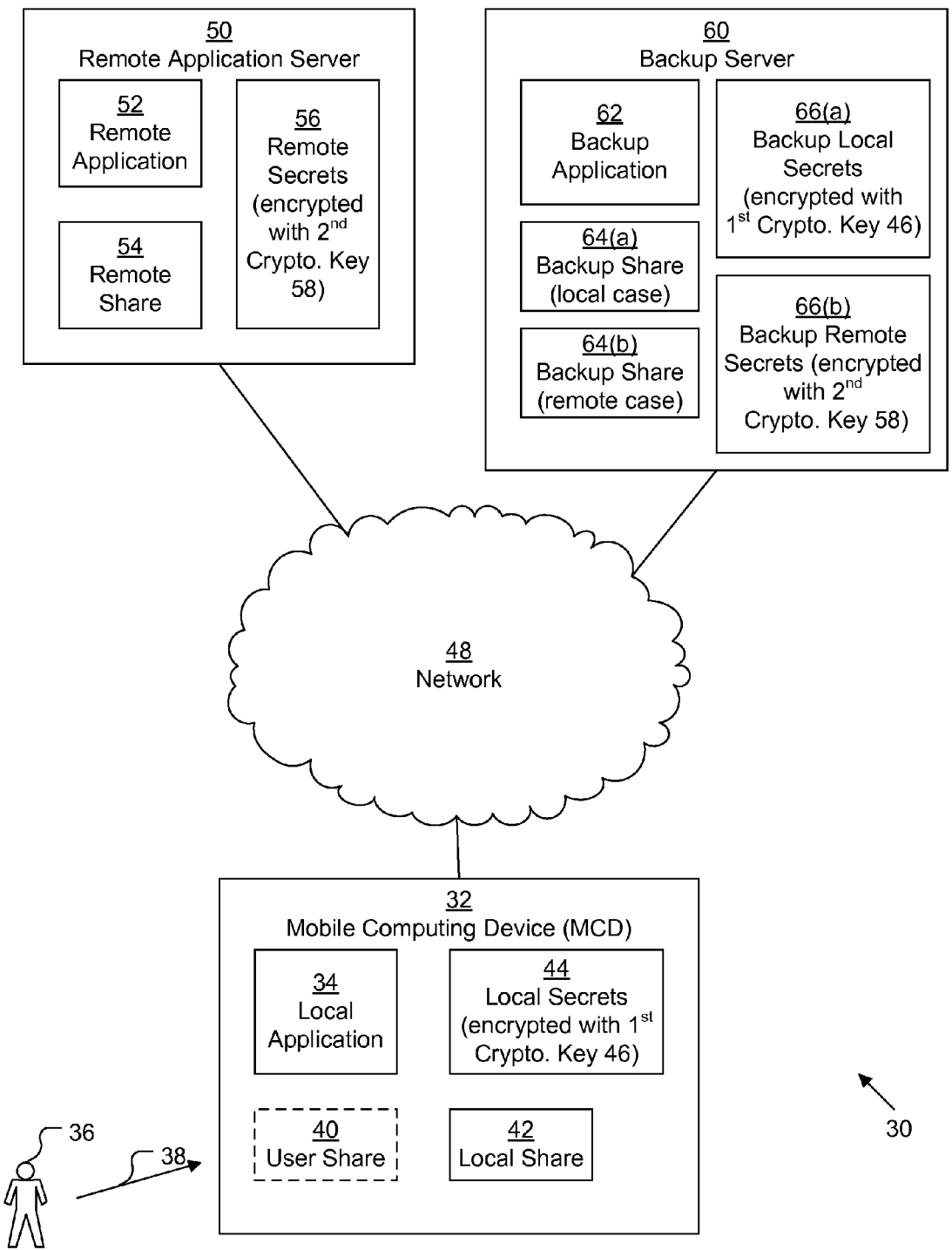
FIG. 1 is a block diagram depicting an example system for use in connection with various embodiments.

FIG. 1 depicts an example system 30 in which improved techniques hereof may be practiced. System 30 includes a mobile computing device (MCD) 32. MCD 32 may be any kind of computing device that is mobile, such as, for example, a smart phone, a tablet computer, a handheld computer, a laptop computer, a smart watch, a wearable computer, etc. MCD 32 runs a local application 34 to perform various methods described herein. A user 36 operating the MCD 32 inputs user-specific data 38 (e.g., a text-based password, a graphical password, a passcode, biometric information, etc.) into the MCD 32, which the MCD 32 uses to create and temporarily store a user share 40. In some embodiments, the user share 40 is equivalent to the user-specific data 38 (i.e., the user-specific data 38 is used as the user share 40 without any further processing), while, in other embodiments, the MCD 32 may apply a deterministic function (e.g., a key derivation function) to the user-specific data 38 in order to generate the user share 40. MCD 32 also stores a local share 42.

User share 40 and local share 42 may be mathematically combined in order to yield an ephemerally-stored first cryptographic key 46. It should be understood that first cryptographic key 46 was previously created and used to encrypt local secrets 44 stored on the MCD 32, but the first cryptographic key 46 has since been deleted. It is, however, possible to recover the first cryptographic key 46 using the user share 40 and the local share 42 (as well as with various other combinations of shares) because shares of the first cryptographic key 46 were previously created using a secret-splitting algorithm, such as the well-known Shamir secret-splitting algorithm, for example. However, as will be described herein, the secret-splitting algorithm is modified to accept at least one fixed share (including the user share 40) as an input.

In operation, when the user 36 enters his or her user-specific data 38, MCD 32 temporarily stores the user share 40 and processes it together with the locally-stored local share 42 to ephemerally yield the first cryptographic key 46, which MCD 32 is then able to temporarily use to decrypt local secrets 44 (and possibly to modify or add to local secrets 44 prior to re-encrypting). In some embodiments, the local application 34 includes a payment wallet function, and local secrets 44 include payment information, such as, for example, a credit card number or other secure account information, allowing the payment wallet to send or receive money to or from another entity, such as a vendor or a customer. In other embodiments, the local application 34 includes an access manager (e.g., a password manager or a credential manager), and the local secrets 44 include an offline password to allow the user 36 to access resources (not depicted) (e.g., encrypted documents) stored on the MCD 32 or which are otherwise locally-accessible. In these embodiments, system 30 also includes a remote application server 50 with which the MCD 32 is able to connect and communicate over a network 48, such as, for example, the Internet, a cellular data network, or a combination thereof. However, in some embodiments, any communications network or combination of such networks may be used. It should be understood that the remote application server 50 is described as being "remote" because it is external to the MCD 32 and in communication therewith via network 48, however, the distance between the MCD 32 and the remote application server 50 need not be large—they could possibly be located within the same room.

Remote application server 50 runs a remote application 52, such as, for example, an online banking application. Remote application server 50 may be any kind of computing device; however, remote application server 50 is typically a server or an enterprise server. Remote application server 50 also stores a remote share 54 and remote secrets 56, which have been encrypted using a second cryptographic key 58, distinct, in most embodiments, from the first cryptographic key 46. It should be understood that second cryptographic key 58 was previously created and used to encrypt remote secrets 56 stored on the remote application server 50, but the second cryptographic key 58 has since been deleted. It is, however, possible to recover the second cryptographic key 58 using the user share 40 and the remote share 54 (as well as with various other combinations of shares) because shares of the second cryptographic key 58 were previously created using a secret-splitting algorithm, such as, for example, a Shamir secret-splitting algorithm modified to accept at least one fixed share (including the user share 40) as an input. In some embodiments, remote secrets 56 may be stored on the MCD 32 rather than on the remote application server 50.

In operation, when the user 36 enters his or her user-specific data 38, MCD 32 temporarily stores the user share 40, temporarily obtains the remote share 54 (and, in some embodiments, also the encrypted remote secrets 56) from the remote application server 50, and processes the user share 40 together with the remote share 54 to ephemerally yield the second cryptographic key 58, which MCD 32 is then able to temporarily use to decrypt remote secrets 56 (and possibly to modify or add to remote secrets 56 prior to re-encrypting). In some embodiments, remote application 52 includes an online banking application and remote secrets 56 may include, for example, another cryptographic key used to secure access to the bank account of the user 36.

System 30 also includes a backup server 60, which runs a backup application 62. Backup server 60 may be any kind of computing device, however, backup server 60 is typically a server, an enterprise server, or a data storage system. Backup server 60 stores one or more backup shares 64, such as a backup share 64(*a*) for use with the first cryptographic key 46 and a backup share 64(*b*) for use with the second cryptographic key 58 (when used). Backup server 60 may also store backed-up secrets 66, such as backup local secrets 66(*a*), which mirror the local secrets 44 from the MCD 32, and backup remote secrets 66(*b*), which mirror the remote secrets 56 from either the remote application server 50 or the MCD 32 (when the remote application server 50 is used).

Backup share 64(*a*) may be combined with either the user share 40 or the local share 42 to recover the first cryptographic key 46 or to perform various other recovery operations associated with use of the first cryptographic key 46. Similarly, backup share 64(*b*) may be combined with either the user share 40 or the remote share 54 to recover the second cryptographic key 58 or to perform various other recovery operations associated with use of the second cryptographic key 58.

Figure 2:
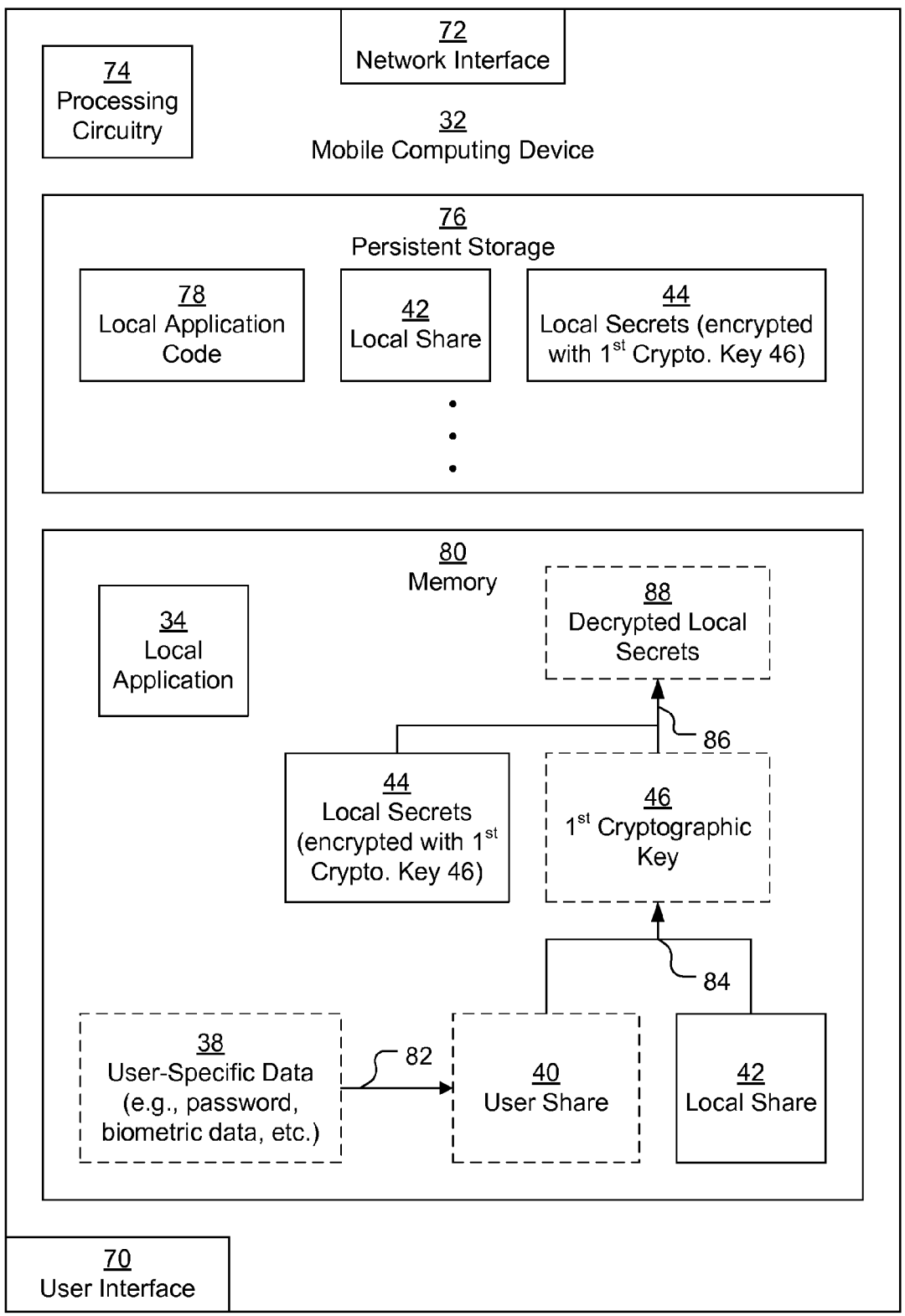
FIG. 2 is a block diagram depicting an example apparatus according to various embodiments.

FIG. 2 depicts an example MCD 32 in further detail. MCD 32 includes user interface (UI) circuitry 70, network interface circuitry 72, processing circuitry 74, persistent storage 76, and memory 80.

UI circuitry 70 may take various forms, depending on the implementation. In one implementation (e.g., when the MCD 32 is a smart phone or a tablet), UI circuitry 70 includes a touch-sensitive display screen embedded within the device together with circuitry for displaying information on the display screen and circuitry for receiving touch commands from the user 36. In another implementation, UI circuitry 70 includes interface circuitry (e.g., a graphics adapter, a various bus ports, etc.) to allow the MCD 32 to interface with the user 36 via user input/output devices (e.g., display screens, keyboards, mice, printers, track pads, etc.). In some embodiments, UI circuitry 70 includes a biometric sensor, such as, for example, a fingerprint scanner or a retina scanner.

Network interface circuitry 72 may include one or more Ethernet cards, cellular modems, Wireless Fidelity (WiFi) wireless networking adapters, any other devices for connecting to a network (e.g., network 48), or some combination thereof. Processing circuitry 74 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Persistent storage 76 may be made up of one or more persistent storage devices, such as, for example, hard disk drives, solid-state storage devices, flash drives, etc. Persistent storage 76 is configured to store programs and data even while the MCD 32 is powered off. The operating system (OS) (not depicted, e.g., Linux, UNIX, Windows, or a similar operating system) and the applications (e.g., local application 34) are typically stored in persistent storage 76 (e.g., local application code 78 is stored on persistent storage 76) so that they may be loaded into memory 80 (e.g., local application code 78 loads into memory 80 as local application 34) from persistent storage 76 upon a system restart. These applications, when stored in non-transient form either in memory 80 or in persistent storage 76, form a computer program product. The processing circuitry 74 running one or more of these applications thus forms a specialized circuit constructed and arranged to carry out the various processes described herein.

Data stored within persistent storage 76 includes the local share 42 and the encrypted local secrets 44. In some embodiments (not depicted), multiple local shares 42 are stored together with respective encrypted local secrets 44, each local share 42 and its respective encrypted local secrets 44 having a separate associated cryptographic key 46. In some embodiments (not depicted), persistent storage 76 also persistently stores the encrypted remote secrets 56.

Memory 80 may be any kind of digital system memory, such as, for example, random access memory (RAM). Memory 80 stores an executing OS (not depicted) and one or more applications (e.g., local application 34) executing on processing circuitry 74 as well as data used by those applications. Memory 80 also stores, during execution of local application 34, the local share 42 and the local secrets 44, loaded from persistent storage 76.

Upon the user 36 entering the user-specific data 38, it may be ephemerally stored within memory 80 (to be deleted when no longer needed). Transformation 82 (in some embodiments it may be a null transformation; in other embodiments it may be any deterministic transformation, such as a key derivation function) fixes the user-specific data 38 into a fixed user share 40, which is also ephemerally stored within memory 80 (to be deleted when no longer needed). A mathematical process 84 is applied to the user share and the local share 42 to recover the first cryptographic key 46, which is also ephemerally stored within memory 80 (to be deleted when no longer needed). A decryption process 86 is applied to the encrypted local secrets 44 using the first cryptographic key 46 to recover the decrypted local secrets 88, which are also ephemerally stored within memory 80 (to be deleted when no longer needed). These ephemerally-stored decrypted local secrets 88, which may include, for example, account information or encryption keys, may then be used to provide the user 36 with access to a protected resource.

In some embodiments (not depicted), memory 80 may also ephemerally store the remote share 54, the second cryptographic key 58 (recovered by applying the mathematical process 84 to the user share 40 and the remote share 54), the remote secrets 56, and decrypted versions of the remote secrets (recovered by applying the decryption process 86 to the encrypted remote secrets 56 using the second cryptographic key 58). In some embodiments (not depicted), memory 80 may also ephemerally store a backup share 64 for use in recovering the local share 42 or remote share 54 or for use in resetting the user share 40.

Figure 3:
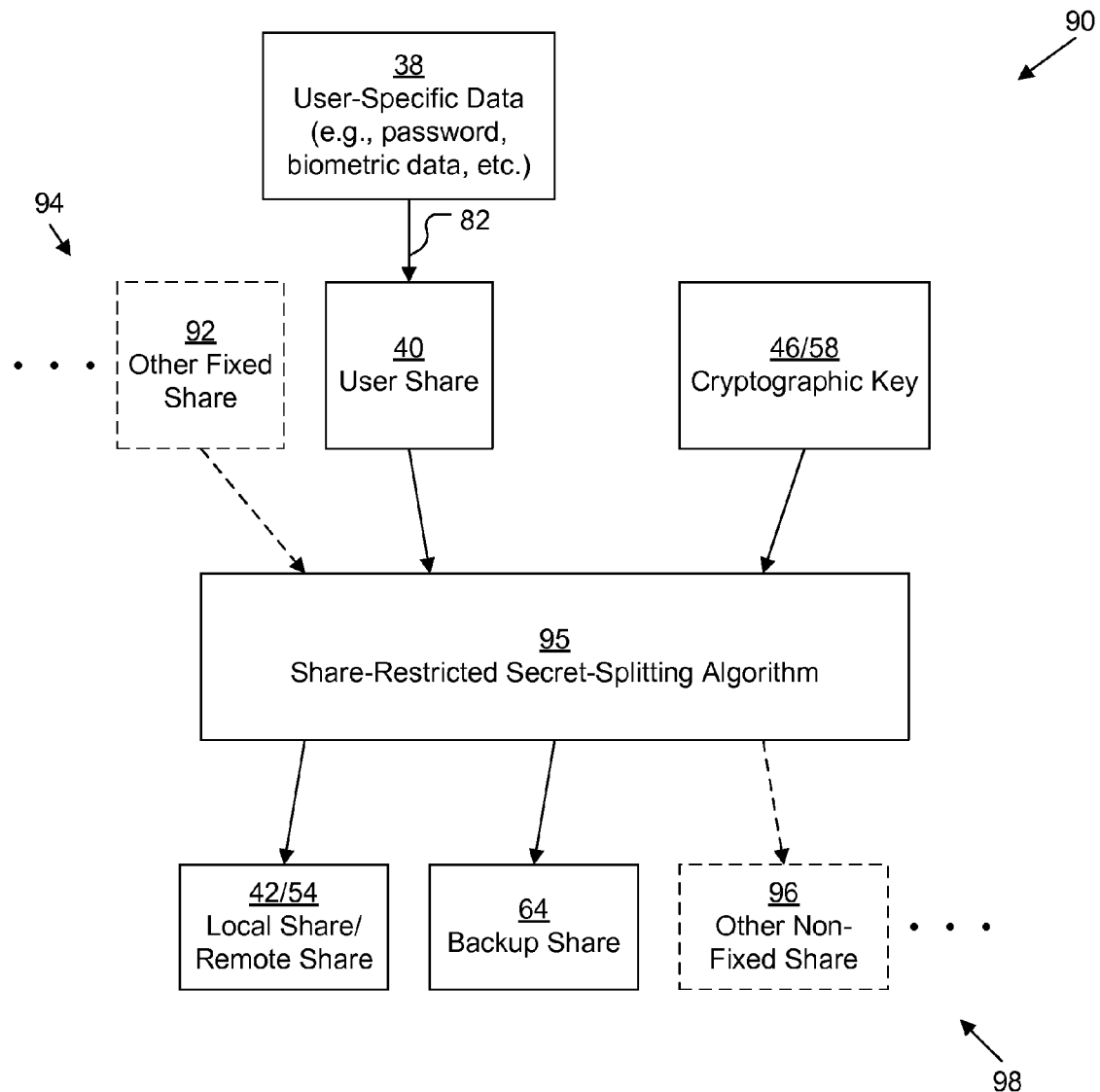
FIG. 3 is a block diagram depicting an example secret-splitting algorithm for use in connection with various embodiments.

FIG. 3 depicts an example process 90 for generating a set of non-fixed shares 98 given a set of one or more fixed shares 94 and an cryptographic key 46, 58. In some embodiments, process 90 may be performed by the MCD 32, but in other embodiments, process 90 may be performed by another computing device as part of an initialization of system 30.

The user 36 initially enters the user-specific data 38 (e.g., using the UI circuitry 70 of the MCD 32 or similar UI circuitry of another computing device), which is then fixed into the user share 40 as described above. This user share 40 is one of the fixed shares 94. There is always at least one fixed share 94, typically including at least one user share 40. In some embodiments, the fixed shares may include one or more other fixed shares 92. These other fixed shares 92 may include user shares for other users, different user shares for the same user 36 (e.g., using different passwords or biometric scans), or shares fixed based on other data such as stable system values (i.e., hardware parameters of trusted devices that generally do not change, as is known in the art).

A random highly-secure cryptographic key 46, 58 is generated according to principles well-known in the art. For example, the highly-secure cryptographic key 46, 58 may be 256 bits, 1024 bits, or another number of bits in length, as demanded by security needs of the application.

The highly-secure cryptographic key 46, 58 and the set of fixed shares 94 are input into a share-restricted secret-splitting algorithm 95 in order to generate the set of non-fixed shares 98. The set of non-fixed shares 98 will always include at least one non-fixed share 98, typically at least a local share 42 or a remote share 54. In addition, in most embodiments, the set of non-fixed shares 98 will include a backup share 64. In some embodiments other non-fixed shares 96 may also be generated, such as, for example, additional backup shares or additional local or remote shares for use with other devices.

The share-restricted secret-splitting algorithm 95 may be any algorithm which is capable of producing a set of non-fixed shares 98 given a set of fixed shares 94 and the cryptographic key 46, 58 as inputs such that some strict subset of the union of the set of non-fixed shares 98 and the set of fixed shares 94 is able to recover the cryptographic key 46, 58, while another strict subset is not able to recover the cryptographic key 46, 58, with no leakage concerning the cryptographic key 46, 58. One example algorithm suitable for this purpose may include a (t, n) Shamir secret sharing scheme, in which the cryptographic key 46, 58 is split into n shares, any t of which may be combined to recover the cryptographic key 46, 58 for t<n. In particular, a share-restricted version of the (t, n) Shamir secret sharing scheme should be used, wherein at least one of the n shares is fixed as an input to the algorithm, although any number of fixed shares 94 less than n may be fixed.

Figure 4A:
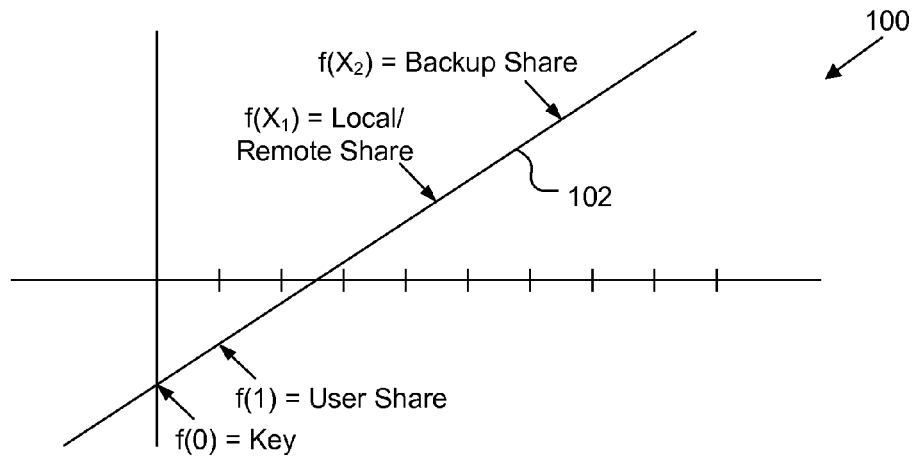
FIGS. 4A and 4B are graphs depicting example schemes for splitting a secret key between various fixed and non-fixed shares.

FIG. 4A depicts an example implementation of a share-restricted (2, 3) Shamir secret sharing scheme 100 in which there is only one fixed share 94, namely the user share 40. A curve (in this case a line 102) defined by a function f(x) is selected such that f(0) is set to be the cryptographic key 46, 58 and f(1) is set to be the user share 80. Although f(0) and f(1) are described, it should understood that other x-values may be used instead. The local share 42 or remote share 54 may then be set to the y-value of another x-value ($X_1$) on the line 102, and the backup share 64 may then be set to the y-value of yet another x-value ($X_2$) on the line 102. In some embodiments, the x-values ($X_1$, $X_2$) for the local share 42 or remote share 54 and the backup share 64 are pre-determined. In other embodiments, the x-values ($X_1$, $X_2$) are selected on-the-fly, but then the resulting non-fixed shares 42/54, 64 are given not as y-values but as coordinate pairs (e.g., backup share 64 would be the pair ($X_2$, f($X_2$))).

In some embodiments (e.g., with certain specific algorithms for implementing a share-restricted Shamir secret sharing scheme), a share-restricted (2, 3) Shamir secret sharing scheme 100 may not yield sufficiently secure results for certain applications. In order to provide a higher level of security, t should be at least equal to 3, and the number of fixed shares should be less than t−1.

Figure 4B:
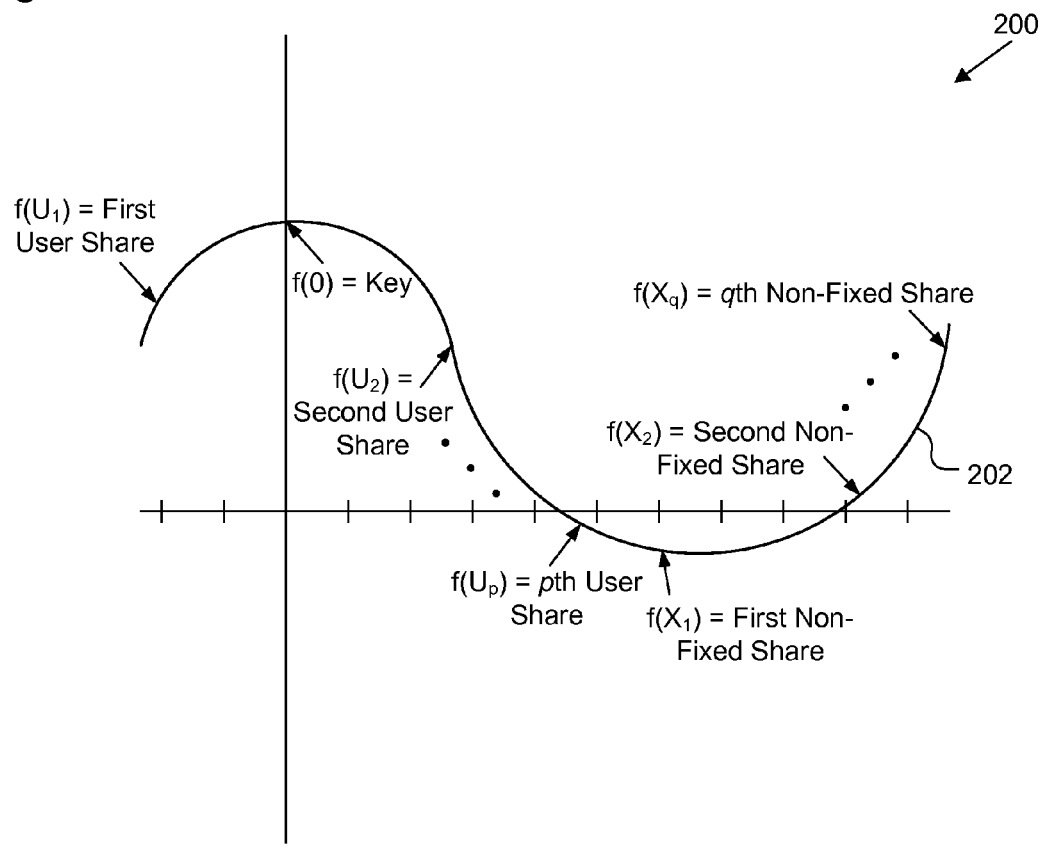

FIG. 4B depicts a more complex, generalized share-restricted (t, n) Shamir secret sharing scheme 200. The curve 202 is a polynomial of order t−1. Since, as depicted, curve 202 is a $3^{rd}$ order polynomial, t is equal to 4. The number of shares, n, is then defined to be p+q, where p is the number of fixed shares and q is the number of non-fixed shares. In order to be highly secure, p<t−1 and t≥3; thus, if we require than n>t (in order to avoid a degenerate case), there should always be at least three non-fixed shares in the highly-secure case. As depicted, we can see that there are at least three fixed shares (first user share $f(U_1)$, second user share $f(U_2)$, and pth user share $f(U_p)$) and at least three non-fixed shares (first non-fixed share $f(X_1)$, second non-fixed share $f(X_2)$, and qth non-fixed share $f(X_q)$), so FIG. 4B may illustrate any share-restricted (4, n) Shamir secret sharing scheme with n≥6. If p=3 and q=3, then it is a share-restricted (4, 6) Shamir secret sharing scheme with three fixed shares. Thus, any combination of at least four shares selected from the three fixed shares and the three non-fixed shares will enable the cryptographic key 46, 58 to be recovered, while any combination of three or fewer shares selected from the three fixed shares and the three non-fixed shares will not enable the cryptographic key 46, 58 to be recovered, and, in fact, no information about the cryptographic key 46, 58 will be leaked.

It should be understood that, in embodiments in which the techniques used do not allow the share-restricted Shamir secret sharing scheme to be highly secure unless p<t−1 and t≥3, the prototypical (2, 3) case presents a problem, since t is too small. This can be overcome by using a share-restricted (3, 5) Shamir secret sharing scheme and combining several of the non-fixed shares 98 together into composite shares (not depicted). Thus, for example, if we wish to have one user share 40 and two non-fixed shares 98 (e.g., local share 42 and backup share 54), then, this may be accomplished by inputting the user share 40 and the cryptographic key 46 into the share-restricted (3, 5) Shamir secret sharing scheme, which yields four fixed shares 98. Then, two of these fixed shares 98 can be combined into a composite local share 42, and the other two of these fixed shares 98 can be combined into a composite backup share 64.

In other embodiments, however, it may be possible to utilize a (2, 3) secret sharing scheme that is based on other techniques that allow it to be highly-secure without using composite non-fixed shares.

Figure 5:
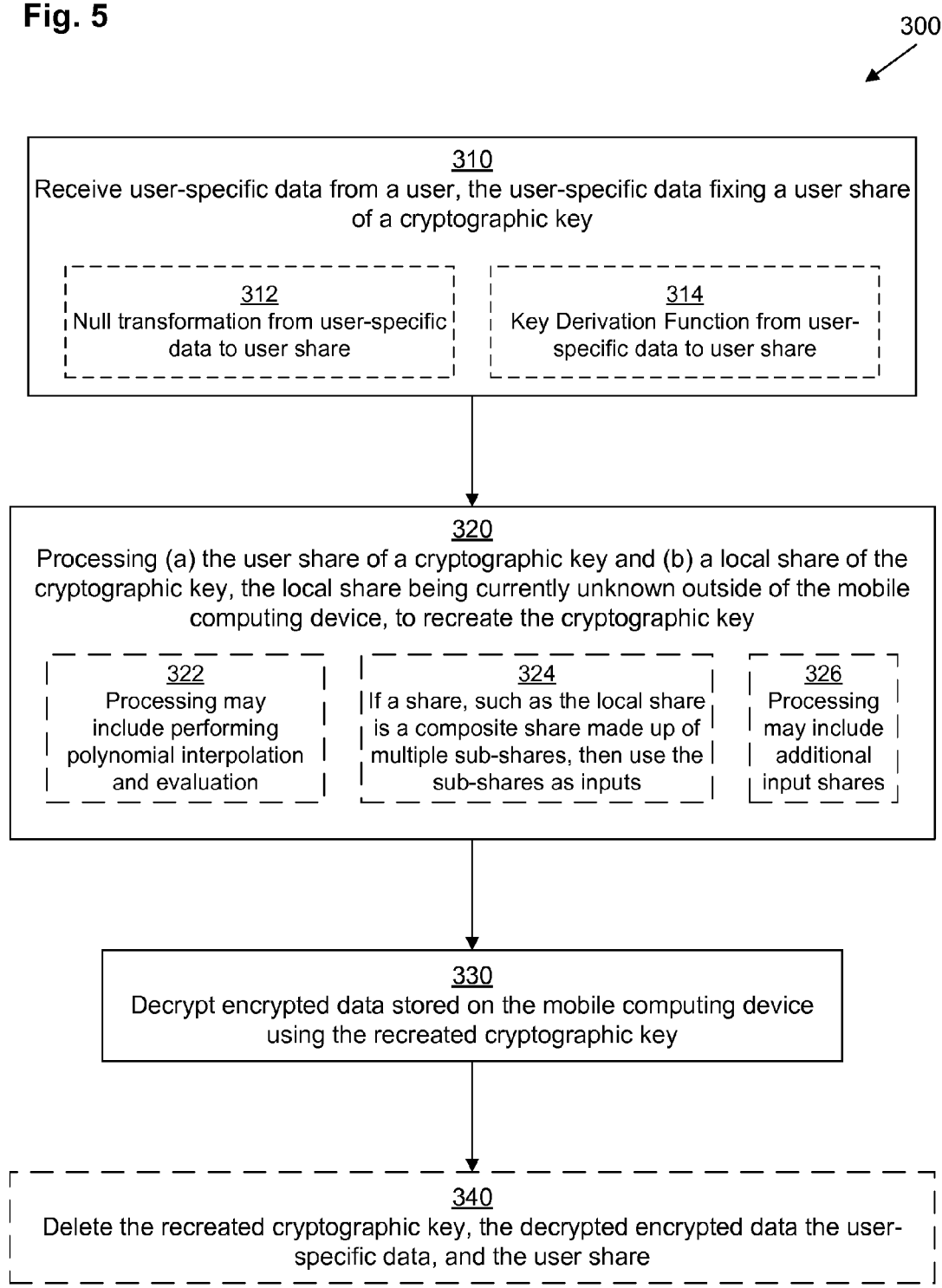
FIG. 5 is a flowchart depicting an example method of accessing a resource according to various embodiments.

FIG. 5 illustrates an example method 300 according to various embodiments performed by MCD 32 for accessing a resource. It should be understood that any time a piece of software, such as, for example, local application 34, remote application 52, backup application 62, etc., is described as performing a method, process, step, or function, in actuality what is meant is that a computing device (e.g., MCD 32, remote application server 50, backup server 60, etc.) on which that piece of software 34, 52, 62 is running performs the method, process, step, or function when executing that piece of software on its processor (e.g., processing circuitry 74).

It should be understood that, within FIG. 5, step 340 and sub-steps 322, 324, and 326 are dashed because they may be ancillary or optional to method 300. It should be understood that, within FIG. 5, sub-steps 312 and 314 are dashed because they represent particular alternative implementations of step 310.

Method 300 is performed by the MCD 32 when the user 36 wishes to access the local secrets 44, typically for the purpose of using the local secrets 44 or a portion thereof to access a protected resource.

In step 310, local application 34 receives user-specific data 38 from user 36, the user-specific data 38 fixing the user share 40 of a cryptographic key (e.g., first cryptographic key 46). In sub-step 312, the local application 34 directly stores the user-specific data 38 as the user share 40 since the fixation is done by way of a null transformation. Alternatively, in sub-step 314, the local application 34 applies a key derivation function (or, in some embodiments, some other non-null transformation) to the user-specific data 38 in order to fix the user share 40. In either case, the user share 40 is generally only stored ephemerally (e.g., for the length of a particular user access session or less) within memory 80.

In step 320, local application 34 processes (a) the user share 40 and (b) the local share 42 of the first cryptographic key 46 (the local share 42 being known because it is stored on the MCD 32) to recreate (or recover) the first cryptographic key 46. Typically, although the local share 40 may have originally been created off of the MCD 32, the local share 40 is currently unknown outside of the MCD 32, all outside copies having been deleted. In some embodiments, the local share 42 may be stored on the MCD 32 (either within persistent storage 76, memory 80, or both) in encrypted form, protected by another encryption key used to prevent tampering.

In some embodiments, step 320 may include (sub-step 322) performing the processing by performing polynomial interpolation and polynomial evaluation. Operation of sub-step 322 may be clarified with reference to FIG. 4A. Since local application 34 knows the user share 40, f(1) is known, and since local application 34 knows the local share 42, $f(X_1)$ is known. If a share-restricted (2, 3) Shamir secret sharing scheme 100 is being used, only two points must be known to define the line 102. Thus, since two points are known, namely (1, f(1)) and $(X_1, f(X_1))$, the local application 34 is able to derive the equation f(x) of the line 102 using simple algebra (polynomial interpolation), allowing the local application 34 to calculate f(0) (polynomial evaluation), which results in knowledge of the first cryptographic key 46.

In some embodiments, if one or more of the non-fixed shares 98 (e.g., local share 42) is composite, step 320 may include (sub-step 324) breaking up the local share 42 into its constituent shares, and using both (or more than two, depending on the embodiment) of the constituent non-fixed shares in the processing (e.g., in the polynomial interpolation of sub-step 322, although the generalized case of FIG. 4B is used).

In some embodiments, step 320 may include (sub-step 326) performing the processing by using additional shares (either fixed shares 94 or non-fixed shares 98) as inputs. For example, if t is greater than 2 and another fixed share 92 or another non-fixed share 96 may be taken as inputs in order to have the appropriate number of shares needed to unlock the cryptographic key 46, 58. Thus, in one example, several different users may each have their own respective user shares, and a combination of user shares for the various users may be used as inputs.

In step 330, local application 34 decrypts encrypted data (e.g., local secrets 44) stored on the MCD 32 (either within persistent storage 76, memory 80, or both), thereby generating ephemerally-stored decrypted local secrets 88 within memory 80, which may be used to provide the user 36 with access to a protected resource (e.g., decrypted local secrets 88 include payment account information to provide access to a payment account or decrypted local secrets 88 include an offline key which may be used to access local encrypted data).

In ancillary step 340, the local application 34 deletes the first cryptographic key 46, the decrypted local secrets 88, the user-specific data 38, and the user share 40 after the user 36 has terminated his access session, if any of those remain in memory 80.

Methods similar to method 300 may also be performed in other contexts. For example, local application 34 may also perform a variant of method 300 in which access to the remote secrets 56 is sought rather than to the local secrets 44. In this variant, the remote share 54 is used in place of the local share 42 in step 320, thereby recovering the second cryptographic key 58 instead of the first cryptographic key 46. In embodiments in which the remote share 54 is stored on the remote application server 50, intermediate steps precede step 320 in which the MCD 32 requests and receives the remote share 54 for ephemeral local storage in memory 80 from remote application server 50. In step 330, the decryption is done using the second cryptographic key 58 instead of the first cryptographic key 46, and the remote secrets 56 are decrypted rather than the local secrets 44. In embodiments in which the remote secrets 56 are stored on the remote application server 50, intermediate steps precede step 330 in which the MCD 32 requests and receives the remote secrets 56 (possibly together with the remote share 54) for ephemeral local storage in memory 80 from remote application server 50. Also, in step 340, the recovered second cryptographic key 58 is deleted rather than the recovered first cryptographic key 46, and the decrypted version of the remote secrets 56 are also deleted. In addition, if received from the remote application server, the remote share 54 and/or the remote secrets 56 may also be deleted. In some embodiments, the variant of method 300 may be performed independently of method 300, while in other embodiments, the variant of method 300 may be performed prior to or after method 300.

In another variant of method 300, local application 34 or a different local application running on MCD 32 may access another set of local secrets distinct from local secrets 44, the other set of local secrets being encrypted with a separate cryptographic key different than first cryptographic key 46 (and second cryptographic key 58). This separate cryptographic key is split into several shares just like the first cryptographic key 46, and the user share 40 may be used for both the first cryptographic key 46 and the separate cryptographic key as the fixed share 94, but a different local share distinct from the local share 42 is used, allowing the separate cryptographic key to be recovered in step 340 using the user share 40 and the different local share rather than recovering the first cryptographic key 46. In some embodiments, in addition to having one separate cryptographic key that protects one other set of local secrets but using the same local share 42, there may be any number of additional separate cryptographic keys that protect other sets of local secrets using the same local share 42. In some embodiments, this other variant of method 300 may be performed independently of method 300, while in other embodiments, this other variant of method 300 may be performed prior to or after method 300.

FIG. 6 illustrates an example method 400 according to various embodiments performed by MCD 32 for accessing a resource. It should be understood that, within FIG. 6, steps 440, 445, 460, and 470 and sub-step 454 are dashed because they may be ancillary or optional to method 400. It should be understood that, within FIG. 6, sub-step 452 is dot-dashed because it represents an alternative implementations of step 450 in cases in which optional sub-step 454 is not performed. Method 400 is typically performed after method 300 (or one of its variants).

Method 400 is performed by the MCD 32 when the user 36 (or possibly another entity) wishes to reset the user share 40, typically upon the user 36 forgetting his password making up the user-specific data 38. In some cases, the user 36 initiates method 400 because his biometric attributes have changed (e.g., due to catastrophic injury), rendering previously-used biometric data of the user-specific data 38 unusable. In some cases, the user 36 may have died, and a trusted heir may seek to reset the user share 40 using new user-specific data 38.

Method 400, although primarily described with respect to resetting the user share 40 for use in conjunction with the local share 42, may also be used to reset the user share 40 for use in conjunction with the remote share 54 (with changes marked in parentheses) or both the local share 42 and the remote share 54.

In step 410, subsequent to deleting the recreated cryptographic key, local application 34 receives a request to reset the user share 40 using new user-specific data 38 to yield a new local share 42 (or remote share 54) and backup share 64. This request will include the new user-specific data 38 entered by the user 36 via the UI circuitry 70. The new user-specific data 38 fixes the new user share 40. In response, in step 420, local application 34 requests and receives the backup share 64(a) from the backup server 60 (although backup share 64(b) may instead be requested if method 400 is being performed in conjunction with remote share 54). In some embodiments, the backup server 60 independently authenticates the user 36 prior to returning the backup share 64.

In step 430, local application 34 processes (a) the backup share 64(a) (or 64(b)), and (b) the local share 40 (or the remote share 54 requested and received from the remote application server 50), to recover the first cryptographic key 46 (or the second cryptographic key 58) again. This processing is similar to that used in step 320 (referencing FIG. 4A or 4B), replacing the use of the user share f(1) with the backup share $f(X_2)$.

In some embodiments, optional steps 440, 445, 460, and 470 and sub-step 454 may be performed in order to replace the first cryptographic key (or the second cryptographic key 58) in conjunction with resetting the user share 40, although this is not necessary.

In optional step 440, local application 34 decrypts the encrypted local secrets 44 (or the encrypted remote secrets 56) using the recovered first cryptographic key 46 (or second cryptographic key 58) from step 430. In optional step 445, which may be performed in parallel with optional step 440, local application 34 generates a replacement "new" first cryptographic key 46 (or second cryptographic key 58) for future use.

In optional step 460, local application 34 re-encrypts the decrypted local secrets 88 (or the decrypted encrypted remote secrets 56) using the new first cryptographic key 46 from step 445. Then, in optional step 470, local application 34 stores the re-encrypted secrets as the local secrets 44 within persistent storage 76 and memory 80 (or as the remote secrets 56 either on the remote application server 50 or within persistent storage 76 and memory 80, depending on the embodiment).

In step 450, which may be performed in parallel with optional steps 460 and 470, local application 34 creates a new set of non-fixed shares 98 using the secret-splitting algorithm (e.g., the share-restricted secret-splitting algorithm 95) using the new user share 40. This new set of non-fixed shares 98 includes a new local share 42 (or remote share 54) and a new backup share 64(a) (or 64(b)). In the standard case in which the first cryptographic key 46 (or second cryptographic key 58) is not replaced, in sub-step 452, the recovered first cryptographic key 46 (or second cryptographic key 58) from step 430 is used as an input to the secret-splitting algorithm 95. However, in the other case involving the optional steps, in optional sub-step 454, the new first cryptographic key 46 (or second cryptographic key 58) from step 445 is used as an input to the secret-splitting algorithm 95 instead.

Finally, in step 480, which may also be performed in parallel with optional steps 460 and 470, local application 34 replaces the local share 42 within persistent storage 76 and memory 80 (or the remote share 54 either on the remote application server 50 or within persistent storage 76 and memory 80, depending on the embodiment) with the new version from step 450. Similarly, local application 34 sends the new backup share 64(*a*) (or 64(*b*)) from step 450 to the backup server 60 to replace the old version. In the case involving the optional steps, local application 34 also sends the new encrypted local secrets 44 (or encrypted remote secrets 56) from optional step 460 to the backup server 60 to replace the old backup local secrets 66(*a*) (or 66(*b*)).

FIG. 7 illustrates an example method 500 according to various embodiments performed by a mobile recovery device (not depicted) in order to recover the local share 42 (and, in some embodiments, the local secrets 44). Mobile recovery device may be another mobile computing device similar to MCD 32 in case the MCD 32 has been lost or stolen. In some embodiments (e.g., if the MCD 32 remains in active possession of the user 36, but has been wiped or suffered from data corruption, etc.), method 500 may be performed by the MCD 32 itself functioning as the mobile recovery device. In embodiments in which the remote share 54 and the remote secrets 56 are stored on the MCD 32, method 500 may also be used to recover the remote share 54 and the remote secrets 56 (with changes marked in parentheses). It should be understood that, within FIG. 7, step 570 is dashed because it may be ancillary or optional to method 500.

Method 500 is performed by the mobile recovery device when the user 36 (or possibly another entity) wishes to recover from loss of the MCD 32 or when the user 36 wants to replace the MCD 32 with a new mobile device (i.e., the mobile recovery device). If the MCD 32 is to be used going forward, method 500 is performed directly by the MCD 32 to recover from damage.

In step 510, a local recovery application (LRA, not depicted) running on the mobile recovery device receives a request to recover the local share 42 (or the remote share 54). In step 520, the LRA receives the user-specific data 38 entered by the user 36 via UI circuitry. The user-specific data 38 fixes the user share 40. In response, in step 530, local application 34 requests and receives the backup share 64(*a*) (or backup share 64(*b*)) from the backup server 60. In some embodiments, the backup server 60 also returns the backup local secrets 66(*a*) (or backup remote secrets 66(*b*)). In some embodiments, the backup server 60 independently authenticates the user 36 prior to returning the backup share 64 and backup secrets 66.

In step 540, the LRA processes (a) the backup share 64(*a*) (or 64(*b*)), and (b) the user share 40, to recreate the underlying polynomial curve, f(x), e.g., 102, 202. This is typically done using polynomial interpolation similar to that used in step 320 (referencing FIGS. 4A and 4B), replacing the use of the local share $f(X_1)$ with the backup share $f(X_2)$.

In step 550, the LRA recovers the local share 42 (or the remote share 54) by using the recreated underlying polynomial curve, e.g., 102, 202. This is typically done using polynomial evaluation. For example, if the x-value of the local share 42 (or the remote share 54), e.g., $X_1$, is known, then the local share 42 (or the remote share 54) can be recovered by evaluating $f(X_1)$. If composite shares are being used, this step may involve evaluating f(x) at two known x-values and combining.

In step 560, the LRA stores the recreated local share 42 (or remote share 54) from step 550 on the mobile recovery device in possession of the user 36. If the local secrets 44 (or remote secrets 56) were also lost, then the LRA may also store the backup local secrets 66(*a*) (or backup remote secrets 66(*b*)) on the mobile recovery device as the local secrets 44 (or remote secrets 56).

FIG. 8 illustrates an example method 600 according to various embodiments performed by a mobile recovery device (not depicted) in order to reset the local share 42 (and, in some embodiments, the local secrets 44). Mobile recovery device may be another mobile computing device similar to MCD 32 in case the MCD 32 has been lost or stolen. In some embodiments (e.g., if the MCD 32 remains in active possession of the user 36, but has been wiped or suffered from data corruption, etc.), method 600 may be performed by the MCD 32 itself functioning as the mobile recovery device. In embodiments in which the remote share 54 and the remote secrets 56 are stored on the MCD 32, method 600 may also be used to recover the remote share 54 and the remote secrets 56 (with changes marked in parentheses).

It should be understood that, within FIG. 8, steps 650, 655, 670, and 680 and sub-step 664 are dashed because they may be ancillary or optional to method 600. It should be understood that, within FIG. 8, sub-step 662 is dot-dashed because it represents an alternative implementations of step 660 in cases in which optional sub-step 664 is not performed.

Method 600 is performed by the mobile recovery device when the user 36 (or possibly another entity) wishes to recover from loss of the MCD 32 or when the user 36 wants to replace the MCD 32 with a new mobile device (i.e., the mobile recovery device). If the MCD 32 is to be used going forward, method 600 is performed directly by the MCD 32 to recover from damage.

Typically, method 500 is used when the MCD 32 remains in possession of the user 36 without having been lost or stolen (e.g., if it has been damaged or wiped), but method 600 is used when the MCD 32 has been lost or stolen (regardless of whether it has been returned to the user 36). This is because if the MCD 32 has been lost or stolen, an attacker may now possess the local share 42 (or the remote share 54), so security may be compromised as long as that local share 42 (or remote share 54) remains valid. In the more extreme case, the cryptographic key 46, 58 may even be reset.

In step 610, a local recovery application (LRA, not depicted) running on the mobile recovery device receives a request to reset the local share 42 (or the remote share 54). In step 620, the LRA receives the user-specific data 38 entered by the user 36 via UI circuitry. The user-specific data 38 fixes the user share 40. In response, in step 630, local application 34 requests and receives the backup share 64(*a*) (or backup share 64(*b*)) from the backup server 60. Typically (especially if the MCD 32 remains lost or stolen), the backup server 60 also returns the backup local secrets 66(*a*) (or backup remote secrets 66(*b*)). In some embodiments, the backup server 60 independently authenticates the user 36 prior to returning the backup share 64 and backup secrets 66.

In step 640, the LRA processes (a) the backup share 64(*a*) (or 64(*b*)), and (b) the user share 40, to recover the first cryptographic key 46 (or the second cryptographic key 58) again. This processing is similar to that used in step 320

(referencing FIGS. 4A and 4B), replacing the use of the local share $f(X_1)$ with the backup share $f(X_2)$.

In some embodiments, especially when extra security is desired, optional steps 650, 655, 670, and 680 and sub-step 664 may be performed in order to replace the first cryptographic key 46 (or the second cryptographic key 58) in conjunction with resetting the local share 42 (or the remote share 54), although this is not necessary.

In optional step 650, LRA decrypts the encrypted local secrets 44 (or the encrypted remote secrets 56) using the recovered first cryptographic key 46 (or second cryptographic key 58) from step 640. In optional step 655, which may be performed in parallel with optional step 650, LRA generates a replacement "new" first cryptographic key 46 (or second cryptographic key 58) for future use.

In optional step 670, LRA re-encrypts the decrypted local secrets 88 (or the decrypted encrypted remote secrets 56) using the new first cryptographic key 46 from step 655. Then, in optional step 680, LRA stores the re-encrypted secrets as the local secrets 44 (or the remote secrets 56) on the mobile recovery device in possession of the user 36.

In step 660, which may be performed in parallel with optional steps 670 and 680, LRA creates a new set of non-fixed shares 98 using the secret-splitting algorithm (e.g., the share-restricted secret-splitting algorithm 95) using the new user share 40. This new set of non-fixed shares 98 includes a new local share 42 (or remote share 54) and a new backup share 64(a) (or 64(b)). In the standard case in which the first cryptographic key 46 (or second cryptographic key 58) is not replaced, in sub-step 662, the recovered first cryptographic key 46 (or second cryptographic key 58) from step 640 is used as an input to the secret-splitting algorithm 95. However, in the other case involving the optional steps, in optional sub-step 664, the new first cryptographic key 46 (or second cryptographic key 58) from step 655 is used as an input to the secret-splitting algorithm 95 instead.

Finally, in step 690, which may also be performed in parallel with optional steps 670 and 680, LRA stores the new local share 42 (or the remote share 54) on the MCD. Similarly, LRA sends the new backup share 64(a) (or 64(b)) from step 660 to the backup server 60 to replace the old version. In the case involving the optional steps, LRA also sends the new encrypted local secrets 44 (or encrypted remote secrets 56) from optional step 670 to the backup server 60 to replace the old backup local secrets 66(a) (or 66(b)).

Thus, embodiments have been described for randomly generating a strong cryptographic key (e.g., first cryptographic key 46 or second cryptographic key 58) used to protect secret data (e.g., local secrets 44 or remote secrets 56) and then utilizing a secret splitting technique (e.g., the share-restricted secret-splitting algorithm 95) to create a plurality of shares of the strong cryptographic key, one of which is fixed (e.g., as the user share 40) based on the user's password or other user-specific data 38 (e.g., a biometric signature). Only by appropriately combining more than one of these shares is the strong cryptographic key unlocked. Further, no information about the strong cryptographic key can be leaked unless the strong cryptographic key is unlocked by the appropriate shares being used.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method of accessing a resource, the method comprising:
   receiving, by a mobile computing device via user interface circuitry, user-specific data from a user;
   processing, by the mobile computing device, (a) a user share of a cryptographic key, the user share being fixed based on the received user-specified data, and (b) a local share of the cryptographic key to recreate the cryptographic key, wherein the local share was created by applying a secret splitting algorithm to the cryptographic key and the user share to yield a set of non-fixed shares including the local share, the user share and the set of non-fixed shares making up a set of shares of the cryptographic key, the cryptographic key being recreatable from a strict subset of the set of shares; and
   decrypting, by the mobile computing device, encrypted data stored on the mobile computing device using the recreated cryptographic key, thereby providing access, using the decrypted encrypted data, to the resource,
   wherein:
   the secret splitting algorithm uses an underlying polynomial; and
   processing the (a) user share and the (b) local share to recreate the cryptographic key includes:
      performing polynomial interpolation to regenerate the underlying polynomial; and
      applying polynomial evaluation on the regenerated underlying polynomial to recreate the cryptographic key.

2. The method of claim 1 wherein the set of shares includes a backup share stored on a backup server remote from the mobile computing device and the method further comprises:
   deleting the recreated cryptographic key, the user-specific data, and the user share from the mobile computing device;
   subsequent to deleting the recreated cryptographic key, receiving, by the mobile computing device, a request to reset the user share using new user-specific data to yield a new user share;
   in response to receiving the request to reset the user share, requesting the backup share from the backup server;
   in response to requesting, receiving the backup share at the mobile computing device from the backup server;
   processing, by the mobile computing device, (a) the backup share, and (b) the local share, to recreate the cryptographic key again;
   creating, by the mobile computing device, a new set of non-fixed shares using the secret splitting algorithm and the new user share, the new set of non-fixed shares including a new local share; and replacing the local share stored on the mobile computing device with the new local share.

3. The method of claim 2 wherein:

the method further comprises:

decrypting, by the mobile computing device, the encrypted data stored on the mobile computing device using the cryptographic key recreated using the backup share;

generating a new cryptographic key;

re-encrypting the decrypted encrypted data using the new cryptographic key; and storing the re-encrypted decrypted encrypted data on the mobile computing device in place of the encrypted data stored on the mobile computing device; and creating the new set of non-fixed shares using the secret splitting algorithm and the new user share includes inputting the new cryptographic key and the new user share into the secret splitting algorithm.

4. The method of claim 1 wherein the set of shares includes a backup share of the cryptographic key stored on a backup server remote from the mobile computing device and the method further comprises:

receiving, at a mobile recovery device in possession of the user, a request to reset the local share;

in response to receiving the request to recover the local share, requesting the backup share from the backup server;

in response to requesting, receiving the backup share at the mobile recovery device from the backup server;

receiving, by the mobile recovery device, the user-specific data from the user;

processing, by the mobile recovery device, (a) the received backup share, and (b) the user share, the user share being fixed based on the received user-specific data, to recreate the cryptographic key again;

creating, by the mobile recovery device, a new set of non-fixed shares using the secret splitting algorithm and the user share, the new set of non-fixed shares including a new local share; and in response to creating the new set of non-fixed shares:

storing the new local share on the mobile recovery device in possession of the user; and deleting the recreated cryptographic key, the backup share, the user-specific data, and the user share from the mobile recovery device.

5. The method of claim 4 wherein:

the backup server stores a backup of application data encrypted with the cryptographic key stored on the mobile computing device; and the method further comprises receiving the backup of the application data encrypted with the cryptographic key from the backup server at the mobile recovery device in possession of the user for storage thereon.

6. The method of claim 5 wherein:

the method further comprises:

decrypting, by the mobile recovery device, the backup of the application data encrypted with the cryptographic key received by the mobile recovery device from the backup server, using the cryptographic key recreated using the backup share;

generating a new cryptographic key;

re-encrypting the decrypted backup of the application data using the new cryptographic key; and storing the re-encrypted decrypted backup of the application data on the mobile recovery device; and creating the new set of non-fixed shares using the secret splitting algorithm and the user share includes inputting the new cryptographic key and the user share into the secret splitting algorithm.

7. The method of claim 1 wherein the set of shares includes a backup share of the cryptographic key stored on a backup server remote from the mobile computing device and the method further comprises:

receiving, at the mobile computing device, a request to recover the local share;

in response to receiving the request to recover the local share, requesting the backup share from the backup server;

in response to requesting, receiving the backup share at the mobile computing device from the backup server;

receiving, by the mobile computing device, the user-specific data from the user;

processing, by the mobile computing device, (a) the received backup share, and (b) the user share, the user share being fixed based on the received user-specific data, to regenerate the underlying polynomial again using polynomial interpolation;

recreating, by the mobile computing device, the local share by applying polynomial evaluation on the regenerated underlying polynomial; and in response to recreating the local share:

storing the recreated local share on the mobile computing device; and deleting the recreated cryptographic key, the backup share, the user-specific data, and the user share from the mobile recovery device.

8. The method of claim 7 wherein:

the backup server stores a backup of application data encrypted with the cryptographic key stored on the mobile computing device; and the method further comprises receiving the backup of the application data encrypted with the cryptographic key from the backup server at the mobile computing device.

9. The method of claim 1 wherein the local share was created by:

applying the secret splitting algorithm to the cryptographic key and the user share to preliminarily yield a set of preliminary non-fixed shares; and combining a plurality of the preliminary non-fixed shares to yield the local share.

10. The method of claim 1 wherein the set of non-fixed shares includes a plurality of non-fixed shares aside from the local share, each of the plurality of non-fixed shares being distributed to a respective machine, each of the plurality of non-fixed shares being currently unknown outside of its respective machine.

11. The method of claim 1 wherein:

the method further comprises receiving, by the mobile computing device via user interface circuitry, other user-specific data from another user, the other user-specific data fixing another user share different than the user share;

the local share was created by applying the secret splitting algorithm to the other user share in addition to the cryptographic key and the user share to yield the set of non-fixed shares including the local share, the set of shares also including the other user share; and processing (a) the user share and (b) the local share to recreate the cryptographic key further includes inputting (c) the other use share to recreate the cryptographic key.

12. The method of claim 1 wherein the method further comprises:
generating the cryptographic key randomly; and
applying a share-restricted (t, n) Shamir secret-splitting algorithm to the randomly-generated cryptographic key also taking the user share as an input, wherein applying the share-restricted (t, n) Shamir secret-splitting algorithm includes:
selecting a polynomial function f(x) of order t−1 [t minus 1] such that f(0) equals the randomly-generated cryptographic key and f(1) equals the user share;
selecting n−1 [n minus 1] points on the polynomial function f(x), each of the selected points defining a different non-fixed share of the set of non-fixed shares; and
setting one of the non-fixed shares defined by a selected point on the polynomial function f(x) as the local share.

13. The method of claim 1 wherein the method further comprises:
generating the cryptographic key randomly;
receiving, by the mobile computing device via user interface circuitry, for a value p−1 [p minus 1] other users, for p≥2, a set of other user-specific data items from a set of one or more other users, the set of other user-specific data items fixing p−1 [p minus 1] user shares different than the user share, the union of the user share and the p−1 [p minus 1] user shares different than the user share defining a set of p fixed shares {FS$_1$, . . . , FS$_p$}; and
applying a share-restricted (t, n) Shamir secret-splitting algorithm to the randomly-generated cryptographic key also taking the set of p fixed shares as an input, wherein applying the share-restricted (t, n) Shamir secret-splitting algorithm includes:
selecting a polynomial function f(x) of order t−1 [t minus 1] such that f(R) equals the randomly-generated cryptographic key for some value R and f(X$_i$)=FS$_i$ for each element of the set of p fixed shares, for some set of values {X$_1$, . . . , X$_p$};
selecting n−p [n minus p] points on the polynomial function f(x), each of the selected points defining a different non-fixed share of the set of non-fixed shares; and
setting one of the non-fixed shares defined by a selected point on the polynomial function f(x) as the local share.

14. A method of accessing a resource, the method comprising:
receiving, by a mobile computing device via user interface circuitry, user-specific data from a user;
processing, by the mobile computing device, (a) a user share of a cryptographic key, the user share being fixed based on the received user-specified data, and (b) a local share of the cryptographic key to recreate the cryptographic key, wherein the local share was created by applying a secret splitting algorithm to the cryptographic key and the user share to yield a set of non-fixed shares including the local share, the user share and the set of non-fixed shares making up a set of shares of the cryptographic key, the cryptographic key being recreatable from a strict subset of the set of shares; and
decrypting, by the mobile computing device, encrypted data stored on the mobile computing device using the recreated cryptographic key, thereby providing access, using the decrypted encrypted data, to the resource,
wherein the encrypted data is used by a first application running on the mobile computing device and the method further comprises:
deleting the recreated cryptographic key, the user-specific data, and the user share from the mobile computing device;
subsequently, receiving, by the mobile computing device, the user-specific data from the user again;
processing, by the mobile computing device, (a) the user share of another cryptographic key, the user share of the other cryptographic key being fixed based on the received user-specified data, the user share of the cryptographic key being the same as the user share of the other cryptographic key, the cryptographic key being different than the other cryptographic key, and (b) another local share of the other cryptographic key to recreate the other cryptographic key, wherein the other local share was created by applying the secret splitting algorithm to the other cryptographic key and the user share to yield another set of non-fixed shares including the other local share, the user share and the other set of non-fixed shares making up another set of shares of the other cryptographic key, the other cryptographic key being recreatable from a strict subset of the other set of shares; and
decrypting, by the mobile computing device, using the recreated other cryptographic key, other encrypted data stored on the mobile computing device used by a second application running on the mobile computing device.

15. The method of claim 14 wherein:
the mobile computing device runs a payment wallet application; and
the encrypted data includes secret user payment information for use in making secured payments by the payment wallet application running on the mobile computing device, wherein the resource is a user's payment account managed by the payment wallet application.

16. A method of accessing a resource, the method comprising:
receiving, by a mobile computing device via user interface circuitry, user-specific data from a user;
processing, by the mobile computing device, (a) a user share of a cryptographic key, the user share being fixed based on the received user-specified data, and (b) a local share of the cryptographic key to recreate the cryptographic key, wherein the local share was created by applying a secret splitting algorithm to the cryptographic key and the user share to yield a set of non-fixed shares including the local share, the user share and the set of non-fixed shares making up a set of shares of the cryptographic key, the cryptographic key being recreatable from a strict subset of the set of shares; and
decrypting, by the mobile computing device, encrypted data stored on the mobile computing device using the recreated cryptographic key, thereby providing access, using the decrypted encrypted data, to the resource,
wherein the encrypted data is used by a first application running on the mobile computing device and the method further comprises:

deleting the user-specific data and the user share from the mobile computing device;

subsequently, receiving, by the mobile computing device, the user-specific data from the user again;

receiving, by the mobile computing device, a remote share from a remote application server running a second application, the remote application server storing the remote share, wherein the remote share was created by applying the secret splitting algorithm to another cryptographic key and the user share to yield another set of non-fixed shares including the remote share, the user share and the other set of non-fixed shares making up another set of shares of the other cryptographic key, the other cryptographic key being recreatable from a strict subset of the other set of shares;

processing, by the mobile computing device, (a) the user share of the other cryptographic key, the user share of the other cryptographic key being fixed based on the received user-specified data, the user share of the cryptographic key being the same as the user share of the other cryptographic key, the cryptographic key being different than the other cryptographic key, and (b) the received remote share to recreate the other cryptographic key; and decrypting, using the recreated other cryptographic key, other encrypted data used by the second application running on the remote application server.

17. The method of claim 16 wherein the other set of shares includes another backup share stored on a backup server remote from the mobile computing device and the method further comprises:

deleting the recreated other cryptographic key, the user-specific data, the user share, and the remote share from the mobile computing device;

subsequent to deleting the recreated cryptographic key, receiving, by the mobile computing device, a request to reset the user share using new user-specific data to yield a new user share;

in response to receiving the request to reset the user share, requesting the backup share from the backup server and the remote share from the remote application server;

in response to requesting, receiving, at the mobile computing device, the backup share from the backup server and the remote share from the remote application server;

processing, by the mobile computing device, (a) the backup share, and (b) the remote share, to recreate the other cryptographic key again;

creating, by the mobile computing device, another new set of non-fixed shares using the secret splitting algorithm and the new user share, the other new set of non-fixed shares including a new remote share; and replacing the remote share stored on the remote application server with the new remote share.

18. The method of claim 17 wherein:
the method further comprises:
receiving, at the mobile computing device, the other encrypted data used by the second application running on the remote application server from the remote application server;

decrypting, by the mobile computing device, the received other encrypted data using the other cryptographic key recreated using the backup share;

generating a new other cryptographic key;

re-encrypting the decrypted other encrypted data using the new other cryptographic key; and storing the re-encrypted decrypted other encrypted data on the remote application server in place of the other encrypted data stored on the remote application server; and creating the other new set of non-fixed shares using the secret splitting algorithm and the new user share includes inputting the new other cryptographic key and the new user share into the secret splitting algorithm.

19. The method of claim 16 wherein:
the mobile computing device runs a password vault application;
the encrypted data includes an offline password for use in accessing locally-stored encrypted data; and
the other encrypted data includes an online password for use in accessing encrypted data stored on the remote application server.

20. An mobile apparatus comprising:
processing circuitry;
user-interface circuitry;
persistent storage storing a local share of a cryptographic key and encrypted data encrypted with the cryptographic key; and
memory storing a set of instructions, which, when executed by the processing circuitry, cause the mobile apparatus to perform the operations of:
receiving, via the user interface circuitry, user-specific data from a user;
processing (a) a user share of the cryptographic key, the user share being fixed based on the received user-specified data, and (b) the local share to recreate the cryptographic key, wherein the local share was created by applying a secret splitting algorithm to the cryptographic key and the user share to yield a set of non-fixed shares including the local share, the user share and the set of non-fixed shares making up a set of shares of the cryptographic key, the cryptographic key being recreatable from a strict subset of the set of shares; and
decrypting, by the mobile apparatus, the encrypted data stored on the persistent storage using the recreated cryptographic key, thereby providing access, using the decrypted encrypted data, to a resource;
wherein:
the secret splitting algorithm uses an underlying polynomial; and
processing the (a) user share and the (b) local share to recreate the cryptographic key includes:
performing polynomial interpolation to regenerate the underlying polynomial; and
applying polynomial evaluation on the regenerated underlying polynomial to recreate the cryptographic key.

21. A computer program product comprising a non-transitory computer-readable storage medium storing a set of instructions, which, when executed by a mobile computing device, cause the mobile computing device to perform the operations of:
receiving, by the mobile computing device via user interface circuitry, user-specific data from a user;
processing, by the mobile computing device, (a) a user share of a cryptographic key, the user share being fixed based on the received user-specified data, and (b) a local share of the cryptographic key to recreate the cryptographic key, wherein the local share was created by applying a secret splitting algorithm to the cryptographic key and the user share to yield a set of non-fixed shares including the local share, the user share and the set of non-fixed shares making up a set of shares of the cryptographic key, the cryptographic key being recreatable from a strict subset of the set of shares; and decrypting, by the mobile computing device, encrypted data stored on the mobile computing device using the recreated cryptographic key, thereby providing access, using the decrypted encrypted data, to a resource;

wherein:

the secret splitting algorithm uses an underlying polynomial; and processing the (a) user share and the (b) local share to recreate the cryptographic key includes:

performing polynomial interpolation to regenerate the underlying polynomial; and applying polynomial evaluation on the regenerated underlying polynomial to recreate the cryptographic key.

\* \* \* \* \*